United States Patent [19]

Sorber

[11] Patent Number: 4,644,167
[45] Date of Patent: Feb. 17, 1987

[54] RADIATION DOSE RATE MEASURING DEVICE

[75] Inventor: Robert Sorber, Charlotte, N.C.

[73] Assignee: Duke Power Company, Charlotte, N.C.

[21] Appl. No.: 706,285

[22] Filed: Feb. 22, 1985

[51] Int. Cl.$^4$ .................... G01T 1/185; H01J 47/02
[52] U.S. Cl. .................... 250/374; 250/385; 250/388
[58] Field of Search .......... 250/374, 388, 389, 385 R; 313/93

[56] References Cited

U.S. PATENT DOCUMENTS

| | | | |
|---|---|---|---|
| 3,250,937 | 5/1966 | Woodworth et al. | 313/93 |
| 3,396,275 | 8/1968 | Martin et al. | 250/472.1 |
| 3,433,953 | 3/1969 | Sweet et al. | 250/336.1 |
| 3,693,011 | 9/1972 | De Vaux et al. | 250/370 |
| 3,749,915 | 7/1973 | Hagood et al. | 250/336.1 |
| 3,916,200 | 10/1975 | Sparks, Jr. et al. | 250/389 |
| 4,101,769 | 7/1978 | Bingo et al. | 250/361 R |

OTHER PUBLICATIONS

J. A. B. Gibson and J. U. Ahmed, "Measurement of Short-Range Radiations", (International Atomic Energy Agency Technical Reports Series No. 150, Vienna, Austria) (Nov. 1973), pp. 17–39.
B. Owen, "The Beta Calibration of Radiation Survey Instruments at Protection Levels", Phys. Med. Biol., vol. 17, No. 2 (1972), pp. 175–186.
G. J. Hine and G. L. Brownell, Radiation Dosimetry, Academic Press, New York, pp. 204–207.
Pages 253–256 of Introduction to Health Physics by Herman Cember, Pergamon Press, Oxford.
Frank H. Attix et al., ed., pp. 1–17, 36–41 and 50–65 of Radiation Dosimetry, Second Edition, vol. II (Instrumentation), Academic Press, New York (1966).
E. Walker et al., "The Response of Selected Survey Instruments to Various Types and Energies of Beta Radiation", R. E. Alexander, "Regulatory Considerations in Beta Measurements," D. W. Murphy et al., "Beta Measurement Evaluation and Upgrade," U.S. Nuclear Regulatory Commission, Proceedings of the International Beta Dosimetry Symposium, Washington, D.C. (pub. Jan. 1984), pp. 221–241, 244–262, 421–424 and 471–474.

Primary Examiner—Janice A. Howell
Assistant Examiner—Constantine Hannaher
Attorney, Agent, or Firm—Shefte, Pinckney & Sawyer

[57] ABSTRACT

A beta radiation particle detector having a housing that is substantially impervious to beta radiation particles and which surroundingly encompasses an ionization chamber which is defined by electrically conductive walls is disclosed. The walls terminate in an edge which defines an opening into the ionization chamber with the opening being covered by a beta radiation pervious electrically conductive window that entraps, within the ionization chamber, a quantity of gaseous molecules which are adapted to ionize upon impact with a beta radiation particle. An electrode is disposed within the ionization chamber and has a generally shallow concave surface having a width which is substantially greater than its depth and which faces the electrically conductive window. The concave surface of the electrode terminates in a generally annular rim that is disposed substantially adjacent to the edge of the walls so that the rim is configured to substantially conform to the electrically conductive walls so as to define a beta radiation sensitive volume generally located within the ionization chamber between the beta radiation pervious electrically conductive window and the concave surface of the electrode. A battery, for establishing an electrical potential between the electrode and the electrically conductive walls and window, is adapted, upon creation of an ion within the beta radiation sensitive volume of the ionization chamber to cause an electric current to flow within a circuit between the walls/window and the electrode. A meter for detecting and measuring the flow of electric current in the circuit and displaying the amount of radiation dose rate present is included.

31 Claims, 6 Drawing Figures

PRIOR DETECTOR

PRIOR DETECTOR

PRIOR DETECTOR

RADIATION DOSE RATE MEASURING DEVICE

BACKGROUND OF THE INVENTION

The present invention relates generally to an ionization chamber device for detecting the presence of ionizing radiation and, in particular, the presence of beta radiation particles and, if beta radiation particles are present, providing a means whereby the amount of radiation dose due to beta radiation particles present may be accurately calculated and displayed. If desired, the device may also serve to detect the presence and calculate and display the amount of radiation dose due to other types of radiation, for example gamma radiation particles.

Virtually ever since the discovery and subsequent utilization of atomic energy it has been known that the presence of various types of radiation particles, such as, for example, alpha, beta and/or gamma particles, is closely associated with the differing sources of atomic energy. Since exposure of individuals to these particles can be quite detrimental to their health and general welfare, it is highly desirable, if not mandatory, that the amount of radiation present in any location be readily and accurately ascertained so that areas of high exposure can either be decontaminated, shielded, or avoided. Ionizing radiation is usually measured in rads per hour for a given unit volume. A "rad" is the unit of absorbed dose in the field of radiation dosimetry. One rad equals the absorption of energy in any medium of 100 ergs per gram.

In response to this long-standing and continuing need for an arrangement for quickly and accurately determining whether a given location has been adversely contaminated with material that emits one or more types of radiation, several radiation particle detectors have been developed over the years. At the heart of these detectors is a chamber located within a housing and generally defined by electrically conductive walls which terminate in an edge that defines an opening into the chamber. Since some types of radiation particles, for example beta radiation particles, are incapable of penetrating the customary materials from which the housing of the detector is usually manufactured, the opening is covered by an electrically conductive window material that is pervious to the type of radiation which the detector is designed to locate so as to permit passage of the radiation particles through the window and opening and into the chamber. Conventional electrically conductive windows are formed by applying a light coating of a conductive material, such as aluminum, onto the window. Covering of the opening by the window material results in a quantity of gaseous molecules being entrapped within the chamber. In most instances the gaseous molecules that are trapped within the chamber comprise normal atmosphere, that is the mixture of various gaseous materials which is usually included within ambient air. However, some of the past radiation detectors have included a chamber which is air-tight and which has been filled with a specific gaseous material, for example, argon. An important aspect of the molecules of the gaseous material which are trapped within the chamber is that they should ionize upon their impact with a particle of the type of radiation which the detector is designed to locate. An electrode, which is physically separated and thus electrically insulated from the electrically conductive walls and window of the chamber, is disposed within the chamber and is electrically connected, by way of a conventional electrical circuit, to a source of electricity located outside of the chamber which, for ease of handling, is preferably a portable source of electricity such as a battery. The source of electricity, e.g. battery, is, in turn, connected, by way of a conventional electrical circuit, to the electrically conductive walls and windows of the chamber so that an electrical potential exists within the chamber between the electrode and the electrically conductive walls of the chamber and between the electrode and the electrically conductive window. A conventional on-off switch has usually been included within the electrical circuit so that the battery and thus the electrical potential existing within the chamber may be selectively activated. Additionally, a conventional meter has also usually been included at some point within the electrical circuit so that any electrical current flowing through the circuit may be detected and measured. The meter is usually powered by being connected, by a second, separate conventional electrical circuit, to its own source of electricity, e.g. a second battery. The meter is usually calibrated to display the amount, in rads per hour, of radiation present.

In the radiation detection or location mode, the on-off switch will be in the "on" mode and, for the reasons discussed above, an electrical potential will exist within the chamber. Accordingly, if a source of radiation particles is present and the radiation pervious window of the detector is oriented so that the radiation particles may pass through the window and the opening into the chamber, the radiation particles, upon entry into the chamber, will impact with the ionizable gaseous molecules located within the chamber and the molecules will be transformed into ions. As a result of the electrical potential existing within the chamber, the ions, depending upon whether they are positively or negatively charged, will flow to either the electrode or the electrically conductive walls/window of the chamber and an electrical current will flow within the electrical circuit connecting the electrode to the walls/window of the chamber. As is well known, the number of ions formed within the chamber and thus the magnitude of the electric current flowing through the circuit between the electrode and the walls of the chamber is directly related to and will vary with both the number of radiation particles entering the chamber and the number of molecules which are located within the chamber and which are capable of being ionized by the radiation particles. As is also well known, the number of molecules capable of being ionized within the chamber is dependent upon the density of the gaseous material trapped within the chamber and the size of the radiation accessible, e.g. radiation sensitive, volume of the chamber, with the number of molecules for a known gaseous material being readily calculable for a known radiation sensitive volume. The radiation sensitive volume of the chamber is less then the total volume of the chamber since the volume which the electrode and any other object within the chamber occupies must be discounted from the total chamber volume. Additionally, where the detector is to be utilized to detect radiation particles which not only cannot penetrate the housing of the detector but also cannot penetrate the electrode located within the chamber, for example beta radiation particles, any area of the chamber which is inaccesible to the beta radiation particles as a result of that area being shielded from the particles by the electrode must also be discounted from the total volume of the chamber. If the detector is to be used to detect the presence of particles which can penetrate the housing, for example gamma radiation particles, a moveable plate or cover which is impervious to beta radiation particles is usually placed over the beta radiation pervious window so that the ionization chamber is completely shielded from beta radiation particles as a result of the chamber being shieldingly surrounded by the combination of the housing and the cover. The resultant electrical current flowing through the circuit between the electrically conductive walls/window and the electrode will be generated solely by radiation particles which are capable of penetrating the housing/cover combination, e.g. gamma radiation particles. Accordingly, the meter of the detector will display the amount of gamma radiation dose rate present, preferably in rads/hour. If beta radiation particles are also present and the cover is removed from over the beta radiation pervious window the magnitude of the electrical current will increase due to increased ionization of the gaseous molecules within the chamber as a result of entry by the beta radiation dose rate into the chamber being permitted. The amount of beta radiation dose rate present is represented by the amount of the increase in the magnitude of the electric current and may be obtained by subtracting the gamma radiation reading from the total radiation reading. A problem with this operation is that the volume of the ionization chamber which is sensitive to beta radiation particles will be different from the volume of the ionization chamber which is sensitive to gamma radiation particles. This problem which will be more thoroughly discussed hereinafter has been approached by prior detectors by including, within the detectors, logic circuitry instructing the detector to disregard any area of the ionization chamber which is not accessible to a particular type of radiation particle when calculating the number of molecules available for ionization.

Conventionally, past detectors have been calibrated by orienting the radiation pervious window and thus the ionization chamber toward a radiation source of known intensity and observing the amount of current flow registered by the meter. Since the amount of radiation dose rate present is related to the amount of current flow by well known conventional equations, the entire range of the detector may, accordingly, be readily calibrated by known methods and the detector may thereafter be utilized by those in the field for its intended purpose.

Unfortunately, past radiation detectors have been subject to persistent problems involving both their inaccuracy and imprecision. These problems have been quite vexatious to those who work in the area in view of the fact that, for the reasons stated above, it is highly critical that they be correctly apprised of the degree of radiation to which they are exposing themselves at all times. Even more vexatious to those in the area was the fact that it appeared that the source of both the inaccuracy and imprecision of the prior detectors was inherent in the chamber/electrode design, itself. Accordingly, it is clear that a need existed for a beta radiation particle detector having improved accuracy and precision and which is also capable of readily separately and individually measuring multiple types of radiation particles.

SUMMARY OF THE INVENTION

The present invention is designed to overcome the disadvantages of the above discussed prior devices by providing a beta radiation particle detector having a housing that is substantially impervious to beta radiation and which surroundingly encompasses an ionization chamber which is defined by electrically conductive walls. The walls terminate in a generally annular edge that defines an opening, preferably substantially circular, into the ionization chamber. A beta radiation pervious electrically conductive window completely covers the opening and entraps, within the ionization chamber, a quantity of gaseous molecules which are adapted to ionize upon impact with beta radiation particles. An electrode is disposed within the ionization chamber and has a generally shallow concave surface which faces the beta radiation pervious window. As used herein, the term "generally shallow concave surface" is meant to include all concave surfaces where the width of the concave surface is greater than the depth of the concave surface. Preferably, the width of the concave surface is at least 1.5 times the depth of the concave surface. More preferably, the width of the concave surface is at least 2.0 times the depth of the concave surface. The shallow concave surface of the electrode terminates in a generally annular rim, preferably substantially circular, which is disposed substantially adjacent to the edge of the walls with the annular rim being configured to substantially conform to the electrically conductive walls so as to define a beta radiation sensitive volume located within the ionization chamber generally between the beta radiation pervious electrically conductive window and the concave surface of the electrode. Preferably, the electrode is an electrically conducting graphite coating which has been applied to an electrically non-conducting electrode support structure. If the electrode is a coating, other electrically conducting coating materials, such as metal coatings, could be utilized. Other electrodes, for example formed sheet metal, could be used. The electrode support structure, preferably, is a polymer selected from the group of polymethyl methacrylate polymers, a material made of or with glass fibers available under the trademark "Fiberglass" or polytetra-fluoroethylene available under the trademark "Teflon". The support could be made of other insulating materials such as glass or other plastics. The cross-section of the shallow concave surface of the electrode may preferably be defined solely by straight lines or, alternatively, solely by at least one curved line. A source of electricity, preferably a portable source such as a battery, is electrically connected by a conventional electrical circuit to both the electrically conductive walls and the electrically conductive window and to the electrode. The source of electricity and the circuitry is adapted to establish an electrical potential within the ionization chamber between the electrode and the electrically conductive walls and between the electrode and the electrically conductive window so that, upon creation of an ion within the beta radiation sensitive volume of the ionization chamber by impact of a beta radiation particle with an ionizable molecule located within the beta radiation sensitive volume, a measurable electric current will flow between the electrically conductive walls/window and the electrode and thus through the electrical circuit between the electrically conductive walls/window and the electrode. A mechanism, preferably a meter, is included in the beta radiation detector to detect and measure any electric current flowing within the electric circuit between the electrically conductive walls/window and the electrode so that, as a result of the conventinally known relationship of the amount of current flowing in the electric circuit between the electrically conductive walls/window and the electrode to the amount of beta radiation dose rate present, the amount of beta radiation dose rate present may be conventionally displayed.

In one embodiment of the present invention the beta radiation particle detector is also a gamma radiation particle detector with the combine beta and gamma radiation particle detector having a housing that is substantially impervious to beta radiation while being substantially pervious to gamma radiation. The housing surroundingly emcompasses an ionization chamber which is defined by electrically conductive walls which terminate in a generally annular edge that defines an opening, preferably substantially circular, into the ionization chamber. A beta and gamma radiation pervious electrically conductive window completely covers the opening and entraps, within the ionization chamber, a quantity of gaseous moelcules which are adapted to ionize upon impact with beta or gamma radiation particles. An electrode is disposed within the ionization chamber and has a generally shallow concave surface which faces the window. Preferably, the width of the concave surface is at least 1.5 times the depth of the concave surface. More preferably, the width of the concave surface is at least 2.0 times the depth of the concave surface. The shallow concave surface of the electrode terminates in a generally annular rim, preferably substantially circular, which is disposed substantially adjacent to the edge of the walls with substantially all of the electrode being configured to substantially conform to the electrically conductive walls so as to define a beta and gamma radiation sensitive volume located within the ionization chamber generally between the beta and gamma radiation pervious electrically conductive window and the concave surface of the electrode. Preferably, the electrode is an electrically conducting graphite coating which has been applied to an electrically non-conducting electrode support structure. If the electrode is a coating, other electrically conductive coating materials, such as metal coatings, could be utilized. Other electrically conductive materials, such as metal sheets, could also be utilized. The electrode support structure, preferably, is a polymer selected from the group of polymethyl methacrylate polymers, a material made of or with glass fibers or polytetrafluoroethylene. The cross-section of the shallow concave surface of the electrode of this embodiment of the present invention may also preferably be defined solely by straight lines or, alternatively, solely by at least one curved line. A source of electricity, preferably a portable source such as a battery, is electrically connected by a conventional electrical circuit to the electrically conductive wall, the electrically conductive window and to the electrode. The source of electricity and the circuitry is adapted to establish an electrical potential within the ionization chamber between the electrode and the electrically conductive walls and between the electrode and the electrically conductive window so that, upon creation of an ion within the beta and gamma radiation sensitive volume of the ionization chamber by impact of a beta or gamma radiation particle with an ionizable gaseous molecule located within the beta and gamma radiation sensitive volume, a measurable electric current will flow between the electrically conductive walls/window and the electrode and through the electrical circuit between the electrically conductive walls/window and the electrode. A mechanism, preferably a meter, is included in the beta and gamma radiation detector to detect and measure any electrical current flowing in the electric circuit between the electrically conductive walls/window and the electrode so that, as a result of the conventionally known relationship between the amount of current flowing in the circuit between the electrically conductive walls/window and the electrode to the amount of beta or gamma radiation present, the amount of beta and gamma radiation dose rate present may be conventionally displayed.

In another embodiment of the present invention the beta radiation particle detector, once again, is also a gamma radiation particle detector and the combined beta and gamma radiation particle detector has a housing that is substantially impervious to beta radiation while being substantially pervious to gamma radiation. The housing, as above, surroundingly encompasses an ionization chamber which is defined by electrically conductive walls which terminate in a generally annular edge that defines an opening, preferably substantially circular, into the ionization chamber. A beta and gamma radiation pervious electrically conductive window completely covers the opening and entraps, within the ionization chamber, a quantity of gaseous molecules which are adapted to ionize upon impact with beta or gamma radiation particles. In this embodiment, a first electrode is disposed within the ionization chamber and has a generally shallow concave surface which faces the electrically conductive window. Preferably, the width of the concave surface is at least 1.5 times the depth of the concave surface. More preferably, the width of the concave surface is at least 2.0 times the depth of the concave surface. The shallow concave surface of the first electrode terminates in a generally annular rim, preferably substantially circular, which is disposed substantially adjacent to the edge of the electrically conductive walls with the rim being configured to substantially conform to the electrically conductive walls so as to define a beta and gamma radiation sensitive volume that is generally located between the electrically conductive window and the shallow concave surface of the first electrode. The cross-section of the shallow concave surface of the first electrode of this embodiment of the present invention may preferably be defined solely by straight lines or, alternatively, solely by at least one curved line. The shallow concave electrode is electrically connected by a conventional electric circuit to a mechanism, preferably a meter which is electrically connected to an electrical ground. The meter is adapted to detect and measure any electrical current flowing in the circuit between the concave electrode and the ground. Also included in this embodiment is a second electrode which is disposed within the ionization chamber and which is adapted to substantially prevent ions created within the ionization chamber outside of the beta and gamma radiation sensitive volume of the ionization chamber from entering the beta and gamma radiation sensitive volume and contributing to the measurable flow of electric current in the circuit between the concave first electrode and the electrical ground. A source of electricity, preferably a portable source such as a battery, is electrically connected, preferably by a conventional electrical circuit, to the electrically conductive walls, to the electrically conductive window and to the second electrode. This electrical circuit is also conventionally electrically grounded. The source of electricity is adapted to establish an electrical potential between both of the electrodes and the electrically conductive walls/window so that, upon creation of an ion within the beta and gamma radiation sensitive volume of the ionization chamber by impact of a beta or gamma radiation particle with an ionizable gaseous molecule located within the beta and gamma radiation sensitive volume, a measurable electric current will flow in the electric circuit between the first electrode and the electrical ground. Additionally, the second electrode will attract the ions formed within the ionization chamber outside of the beta and gamma radiation sensitive volume of the ionization chamber as a result of the electrical potential which has been established between the electrically conductive walls/window and the second electrode and then electrically diverts, e.g. bleeds off, the ions to the conventional ground. Preferably, the first and second electrodes are both supported on an electrically non-conducting electrode support structure which is disposed within the ionization chamber and which electrically insulates the two electrodes from each other. It is also preferable that the electrode support structure is a polymer material selected from the group of polymethyl methacrylate polymers, a material made of or with glass fibers or polytetrafluoroethylene and that the two electrodes each are an electrically conductive graphite coating which has been applied to the electrode support structure with the two coatings being electrically insulated and physically separated from each other by the electrically non-conducting electrode support structure. If the electrodes are formed from a coating, other electrically conductive materials, such as metal coatings, could be utilized. Other electrically conductive materials such as metal sheets could be utilized. The meter is adapted to detect and measure any electric current flowing in the circuit between the first electrode and the electrical ground so that, as a result of the conventionally known relationship between the amount of current flowing in that circuit to the amount of beta or gamma radiation dose rate present, the amount of beta or gamma radiation dose rate present may be conventionally displayed.

The present invention accurately measures both beta and gamma dose rate because it is provided with a generally shallow concave electrode which causes the radiation sensitive volume of the detector to be substantially constant regardless of the angle of incidence of the radiation particles, so long as the radiation does not emanate from beind the plane of the window of the detector. The detector may be configured so that the beta radiation sensitive volume and the gamma radiation sensitive volume are substantially equal to each other.

DETAILED DESCRIPTION OF THE INVENTION

Figure 1:
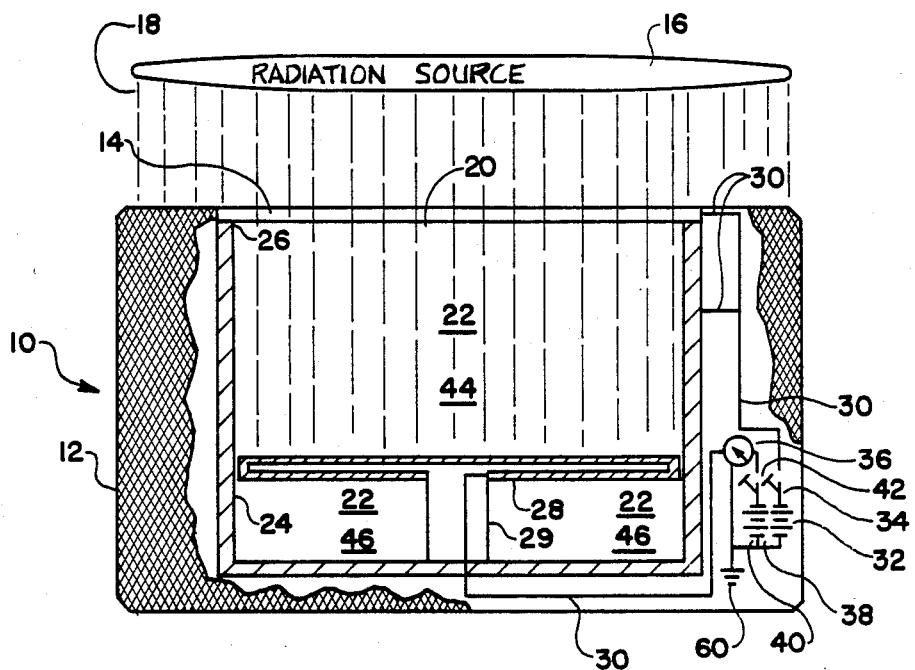
FIG. 1 is a schematic side elevational view with portions cut away and cross-sectioned for purposes of clarity of a prior beta radiation particle detector having a source of beta radiation ideally located in front of the window of the detector.

FIG. 1 is a schematic side elevational view, with portions cut away and cross-sectioned for purposes of clarity, of a prior beta radiation particle detector, generally illustrated at 10, that, as is conventional, is contained within a beta radiation impervious housing 12 and which, in FIG. 1, is oriented with its beta radiation pervious electrically conductive window 14 directly facing a source 16 which generally emits beta radiation particles which are indicated by lines 18. The electrically conductive window is formed from a conventional beta radiation pervious window material having a light coating of an electrically conductive material such as aluminum coated thereon. The beta particles 18 pass through the electrically conductive window 14 which covers an opening 20 into the detector's ionization chamber 22 which is defined by electrically conductive walls 24 which terminate in an edge 26 that defines the opening 20 into the chamber 22. The detector 10 also includes a beta radiation impervious plate or cover (not shown) which is adapted to selectively completely cover the opening 20. A conventional electrode 28 having a substantially planar surface facing the window 14 is positioned within the chamber 22. The electrode 28 may be a coating of an electrically conductive material, such as graphite or metal, which has been applied to, e.g. coated onto, an electrode support structure 29 made from an electrically non-conductive, e.g. electrically insulating, material such as a material made of or with glass fibers, available under the trademark "Fiberglass", or polytetrafluoroethylene, available under the trademark "Teflon". The electrode 28 is electrically connected, by a conventional electrical circuit 30, to a conventional meter 36 for detecting and measuring any electric current flowing in the circuit 30 and for displaying the amount, in rads per hour, of radiation present are included in the electric circuit 30. The meter 36, which may be a conventional ampmeter, is separately powered by a second source of electricity, such as a battery 38, which is electrically connected to the meter 36 by a conventional electric circuit 40 which may include its own on-off switch 42. The circuitry of the detector is conventionally grounded as at 60. The electric circuit 30 also electrically connects the meter 36 to a source of electricity such as, for example, a battery 32 and connects the battery 32 to the electrically conductive walls 24 of the chamber 22 and to the electrically conductive window 14. A conventional on-off switch 34 is also included within the circuit 30.

Once the beta radiation particles 18 have entered the chamber 22 they will impact the ionizable gaseous molecules (not shown) which are located within the chamber 22 and, for the reasons stated above, an electric current will flow through the circuit 30. The electric current will be detected and measured and the amount of radiation dose rate present will be displayed by the meter 36. Since the beta radiation particles 18 as well as being incapable of penetrating the housing 12, as stated above, are also incapable of penetrating the electrocde 28 it is readily apparent that the area or volume of the chamber 22 which is in fact sensitive to the beta radiation particles is the sensitive volume 44 which is located between the electrode 28 and the electrically conductive window 14. Since, for the reasons stated above, accurately determining the beta radiation sensitive volume 44 is critical to both the calibration procedure and also to each individual field measurement, prior beta radiation detectors have been designed to disregard the volume 46 of the chamber 22 which is shielded by the electrode 28 from the beta radiation particles 18, as well as the volume of both the electrode 28 and the electrode support structure 29 in calculating the beta radiation sensitive volume 44 to be used in determining the number of gaseous molecules which are located within the chamber 22 and which are capable of being ionized by the beta radiation particles 18. Unfortunately, while disregarding of the volume of the electrode 28, the volume of the electrode support structure 29 and the shielded volume 46 in calculating the beta radiation sensitive volume generally results in a correct reading and thus correct measurement of, for example, an ideally placed beta radiation source 16 such as the one illustrated in FIG. 1, such ideal circumstances rarely occur when the detector is being utilized in the field.

Figure 2:
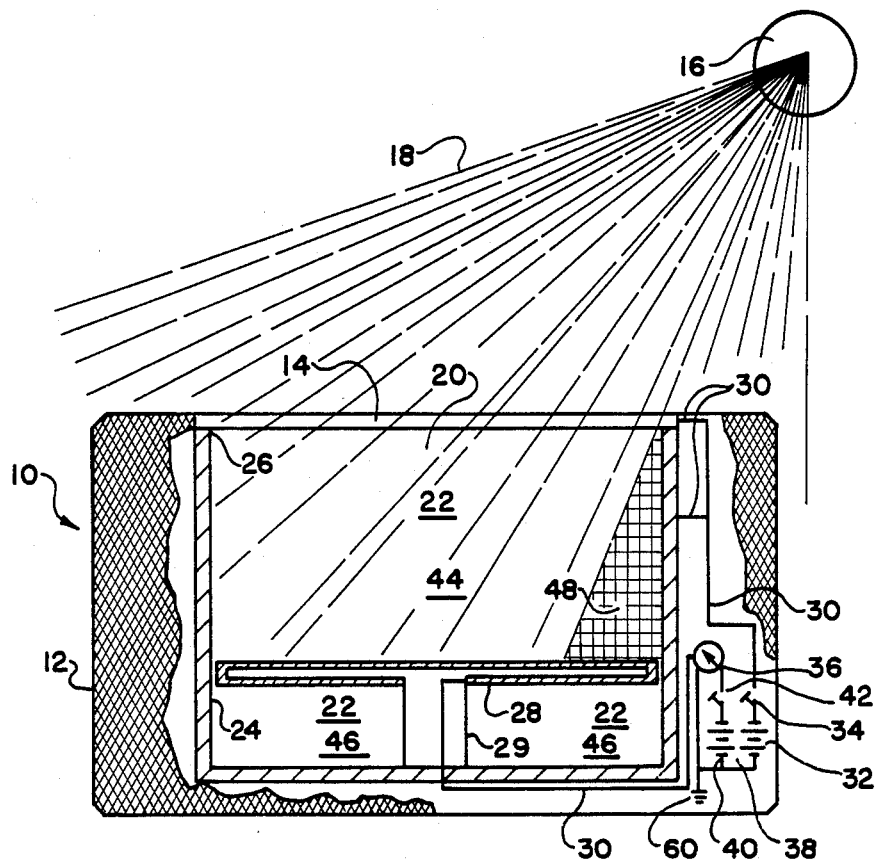
FIG. 2 is a schematic side elevational view with portions cut away and cross-sectioned for purposes of clarity of a prior beta radiation particle detector having a source of beta radiation located to the side of the window of the detector.

FIG. 2, which is also a schematic side elevational view with portions cut away and cross-sectioned for purposes of clarity of the prior beta radiation particle detector 10 of FIG. 1, illustrates an exemplary situation which might be encountered in the field where the beta radiation source 16, which is unknown to the individual using the detector 10, is not ideally located directly in front of the electrically conductive window 14 and the ionization chamber 22 of the detector 10. In this situation, as a result of the fact that the housing 12 of the detector 10 is impervious to the beta radiation particles 18, an area or volume 48 of the sensitive volume 44 of the detector 10 will be screened from the beta radiation particles 18 and no ionization will take place within the screened volume 48. This situation is quite unsettling since, regardless of the spacial orientation of the beta radiation source 16 it is imperative that an individual who is exposed to the beta radiation source 16 and the beta particles 18 emanating therefrom be accurately and precisely informed of the amount of beta radiation dose rate resulting from the beta radiation particles 18 radiating from the source 16. Even more disquieting is the fact that, as a result of the screened volume 48 of the sensitive volume 44 being unavailable for the formation of ions which will contribute to the flow of electricity within the circuit 30, the flow of electrical current measured by the meter 36 will be less than it should be and the resultant calculation and display of the amount of beta radiation 18 present by the meter 36 will be inaccurately displayed as being lower than that which is actually present. The dangers inherent in this situation are readily recognizable. Furthermore, it is apparent that if the beta radiation detector 10 is not properly oriented during calibration, the detector 10 will be improperly calibrated and will subsequently suffer from inaccuracy resulting from poor initial calibration and variations in the size of the screened volume 48 present in any given measurement and imprecision resulting from variations in the size of the screened volume 48 present in each subsequent individual measurement.

Figure 3:
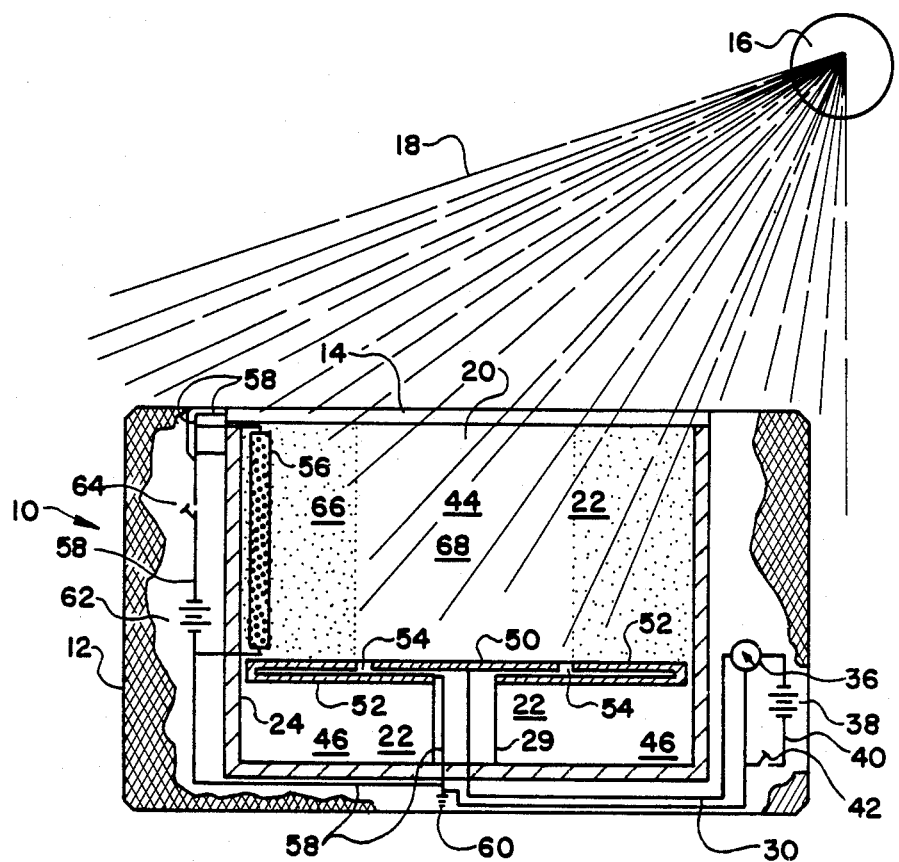
FIG. 3 is a schematic side elevational view with portions cut away and cross-sectioned for purposes of clarity of a prior beta radiation particle detector which has field shaping electrodes located adjacent the electrically conductive walls of the detector and which completely surround the ionization chamber and with a source of beta radiation located to the side of the window of the detector.

At least one prior attempt has been made to overcome the discussed deficiencies of the above-described prior detector. In such a prior attempt, which is depicted in FIG. 3, which is a schematic side elevational view with portions cut away and cross-sectioned for purposes of clarity, the electrode is divided into an inner electrode 50 and an outer electrode 52 which are physically separated and thus electrically insulated from each other as at 54. Additionally, field shaping electrodes 56 (shown for purposes of clarity, only at one side of the chamber 22) have been added inside of the chamber 22 around the electrically conductive walls 24 and between the electrode and the electrically conductive window 14. The outer electrode 52 and the field shaping electrodes 56 are conventionally electrically grounded by an electrical circuit 58 at 60. A battery 62 is included within circuitry 58 and is electrically connected to both the field shaping electrodes 56, the electrically conductive walls 24, the electrically conductive window 14 and the outer electrode 52 by the conventional electric circuit 58 which includes a conventional on-off switch 64. An electrical potential is thereby established between the field shaping electrodes 56, the electrically conductive walls 24, the electrically conductive window 14 and the outer electrode 52. Accordingly, substantially all of the ions formed in the outer volume 66 of the sensitive volume 44, depending on their charge, will flow either toward the outer electrode 52 or toward the electrically conductive walls 24 of the electrically conductive window 14 and away from the inner electrode 50. In this detector the electrical current measuring ampmeter 36 is electrically connected by circuit 30 only to the inner electrode 50 and, since substantially all ions formed in the outer volume 66 will not be permitted to flow to the inner electrode 50, the beta radiation sensitive volume of this detector, e.g. the volume which is capable of creating flow of electricity in the circuit 30, is generally defined by the inner volume 68 which is located above the inner electrode 50. Both circuits 30,58 are conventionally grounded as at 60. As can be readily seen from FIG. 3, this configuration does reduce the screened volume of the beta radiation sensitive volume 68 of the detector. Unfortunately, at least three problems are still present in this detector. They are: (1) field shaping electrodes are expensive, (2) the precision of the detector is reduced since the size of the beta radiation sensitive volume of the detector has been reduced and (3) when the source 16 of radiation particles 18 is located at a very acute angle to the plane of the electrically conductive window 14 a portion of the beta radiation sensitive volume 68 may still be screened from the beta radiation particles 18.

Another problem which is present in the above-discussed prior detectors has been encountered when it is desired to utilize the detectors to separately and individually detect and measure dose rates due to multiple types of radiation particles, some of which are able to penetrate the housing 12 of the detector 10 and some of which are not able to penetrate the housing 12 of the detector 10. Such utilization may be necessary if calculation of the amount of beta radiation dose rate present is based, for example upon first determining the amount of gamma radiation dose rate present, secondly determining the amount of beta and gamma radiation dose rate present and then subtracting the first measurement from the second measurement. Another example of such utilization would be encountered in also using the above-described beta radiation detectors to individually and separately measure dose rate due to gamma radiation particles which are able to penetrate the housing 12 of the detector 10. As was stated above a problem arises in such situations from the fact that the beta radiation sensitive volume will not be the same as the gamma radiation sensitive volume since the gamma radiation particles will not be screened from the ionization chamber 22 by the housing 12. Thus, for example in FIGS. 1 and 2, both the previously shielded volume 46 and the screened volume 48 will be accessible to gamma radiation particles and thus be available for ion formation therein upon impact of gamma radiation particles with the ionizable molecules located therein. Accordingly, since the gamma radiation sensitive volume will be different from the beta radiation sensitive volume, a volume correction factor must be applied in calculating the amount of gamma radiation present. This clearly undesirably complicates the detection and measuring process which, it should be remembered, is usually spontaneously occurring in the field.

Figure 4:
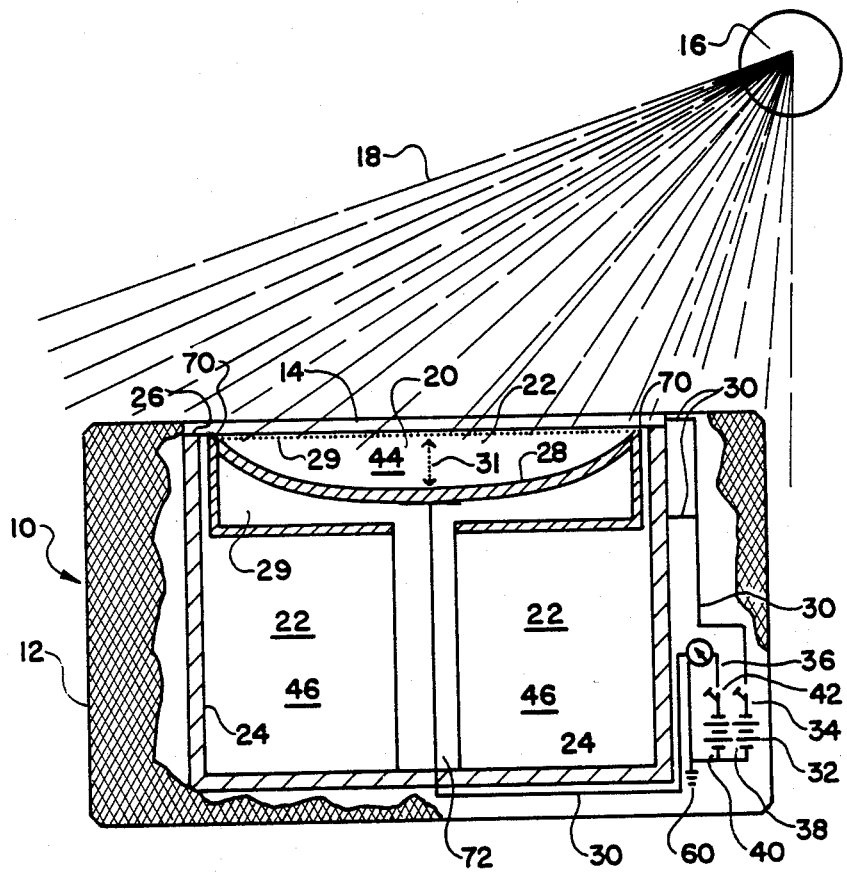
FIG. 4 is a schematic side elevational view with portions cut away and cross-sectioned for purposes of clarity of one embodiment of a beta radiation particle detector constructed in accordance with the teachings of the present invention, and with a source of radiation located to the side of the window of the detector.
Figure 5:
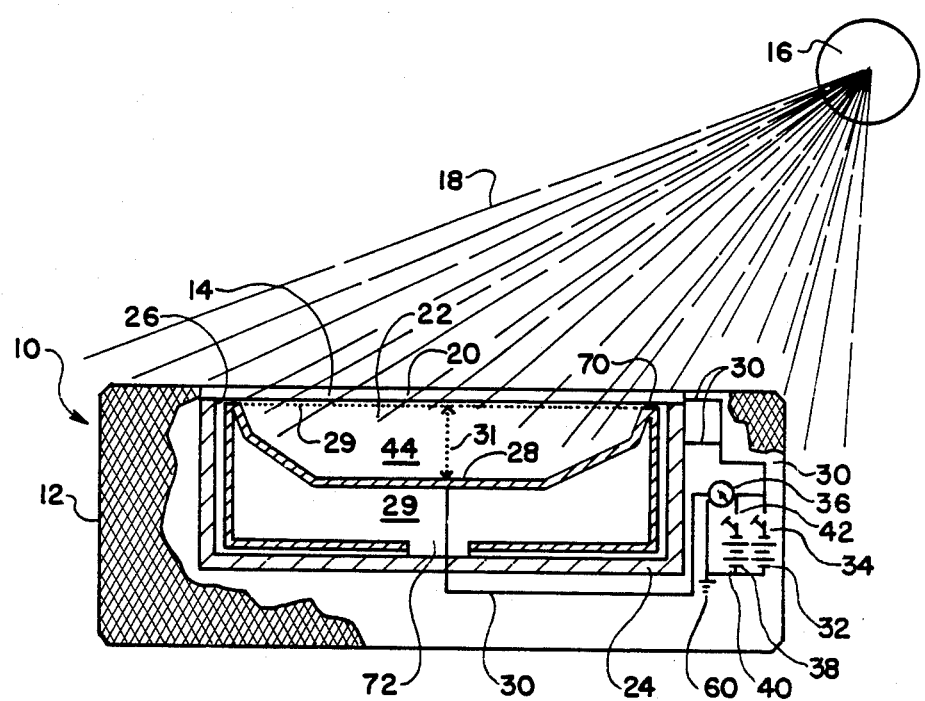
FIG. 5 is a schematic side elevational view with portions cut away and cross-sectioned for purposes of clarity of another embodiment of a beta radiation particle detector constructed in accordance with the teachings of the present invention, and with a source of beta radiation non-ideally located to the side of the window of the detector.
Figure 6:
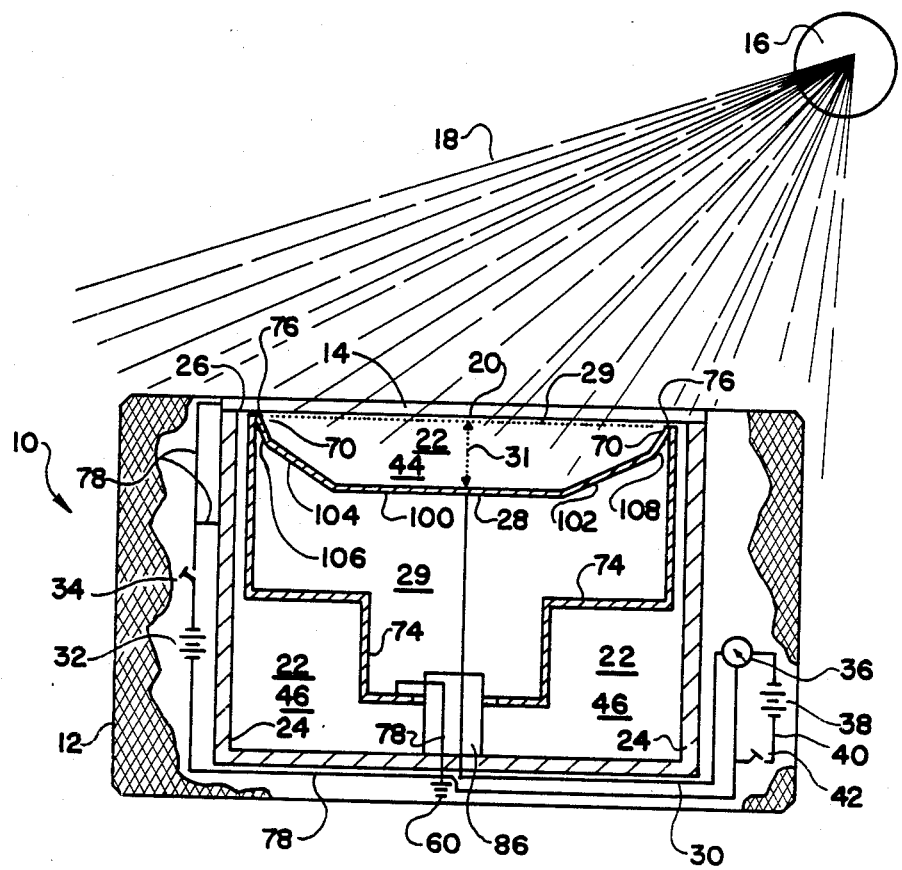
FIG. 6 is a schematic side elevational view with portions cut away and cross-sectioned for purposes of clarity of yet another embodiment of a beta radiation particle detector constructed in accordance with the teachings of the present invention, and with a source of beta radiation located to the side of the window of the detector.

Turning now to FIGS. 4-6 and, in particular, to FIG. 4 which is a schematic side elevational view, with portions cut away and cross-sectioned for purposes of clarity, of one embodiment of a beta radiation particle detector, generally indicated at 10, constructed in accordance with the teachings of the present invention. The beta radiation detector 10 has a housing 12 which is substantially impervious to beta radiation particles and which generally surroundingly encloses or encompasses and protects the various internal components of the detector 10 from wind, rain, etc. The detector 10 is oriented so that its beta radiation pervious electrically conductive window 14, which is preferably a conventional beta radiation pervious material to which a light coating of an electrically conductive material, such as aluminum, has been applied, is not directly facing a source of radiation 16 which is emitting beta radiation particles, generally designated by the lines 18. This orientation is intended to generally represent an exemplary orientation which could be encountered during utilization of the detector 10 in field applications. As can be readily seen, the beta radiation particles 18 pass through the beta radiation pervious electrically conductive window 14.which completely covers an opening 20 into an ionization chamber 22. The detector 10 also includes a beta radiation impervious plate or other cover arrangement (not shown) adapted to selectively completely cover the opening 20. The ionization chamber 22 is defined by electrically conductive walls 24 which terminate in a generally annular edge 26 which defines the opening 20 into the ionization chamber 22. While the ionization chamber is depicted in the figures as being completely defined by the electrically conductive walls 24 those of skill in the art will recognize, after review of the hereincontained disclosure, that the chamber 22 could be defined, in part, by non-electrically conductive walls. As a result of the beta radiation pervious electrically conductive window 14 completely covering the opening 20 into the ionization chamber 22, a quantity of gaseous molecules (not shown) is entrapped within the ionization chamber 22. Typically the gaseous molecules which are entrapped within the ionization chamber 22 comprise the normal atmospheric mix of components which makes up ambient air. However, if desired, the gaseous molecules which are entrapped within the ionization chamber may consist essentially of a given gaseous material such as, for example, argon. In this situation the electrically conductive walls 24 and the beta radiation pervious electrically conductive window 14 should be joined in a conventional air tight manner so that the ionization chamber 22 is air tight and the specific gas entrapped therein will not escape. An important feature of the beta radiation detector is that the gaseous molecules which are entrapped within the ionization chamber 22 are adapted, upon being impacted by a radiation particle, e.g. beta radiation particle, to ionize.

An electrode 28 having a generally shallow concave surface which has a width 29 and a depth 31 faces the electrically conductive window 14 and which terminates in a generally annular rim 70 is disposed within the ionization chamber 22. The generally shallow concave surface of the electrode 28 may be formed from any combination of straight and/or curved lines. However, the width of the generally shallow concave surface is greater than the depth of the generally shallow concave surface in order to minimize shadowing of off-axis radiation. Preferably, the width of the concave surface of the electrode 28 is at least 1.5 times the depth of the concave surface of the electrode. More preferably, the width of the concave surface of the electrode 28 is greater than 2.0 times the depth of the electrode 28. For example, if the depth of the concave surface of the electrode was one (1) inch, the width of the concave surface of the electrode is greater than one (1) inch, preferably at least 1.5 inches and more preferably is at least 2.0 inches. For example, in the embodiment illustrated in FIG. 4 the cross-section of the substantially concave surface of the electroce 28 is defined solely by a curved line whereas the concave surface of the electrodes 28 which are illustrated in FIGS. 5 and 6 are defined solely by straight lines. The rim 70 of the electrode 28 is disposed substantially adjacent to the edge 26 of the electrically conductive walls 24 and is configured so as to substantially conform to the electrically conductive walls 24. As used herein with regard to the location of the generally annular rim 70 of the electrode 28 with respect to the generally annular edge 26 of the electrically conductive walls 24 the term "substantially adjacent" is meant to include any and all arrangements wherein the rim 70 of the electrode is adjacent to the edge 26 but not in physical contact with the electrically conductive walls 24. As used herein with regard to the location of the electrode 28 or the rim 70 of the electrode with respect to the electrically conductive walls 24, the term "substantially conform" is intended to include any and all arrangements wherein the electrode 28 closely conforms to the electrically conductive walls 24 but does not physically contact the walls 24. Contact of the rim 70 or any other part of the electrode 28 with the electrically conductive walls 24 must not occur so as to avoid electrical shorting between the two components. As is illustrated in FIG. 4 the electrode 28 may be a coating of an electrically conductive material, such as, for example, graphite or metal, which has been coated or otherwise applied onto an electrode support structure 29 which, for reasons which will hereinafter become apparent, is preferably made from an electrically non-conductive, e.g. electrically insulating material. Examples of such materials are a polymer selected from the group of polymethyl methacrylate polymers available under the trademark "Plexiglass", a material made of or with glass fiber available under the trademark "Fiberglass", or polytetrafluoroethylene available under the trademark "Teflon". The electrode support structure 29 preferably includes an electrically non-conducting, e.g. electrically insulating, extending foot portion 72 which is mounted on the electrically conducting walls 24 and which physically separates and electrically insulates the electrode 28 from the electrically conductive walls 24.

As a result of the rim 70 of the electrode 28 being substantially adjacnet the edge 26 of the opening 20, and also substantially conforming in non-contacting relationship to the electrically conductive walls 24, the shallow concave surface of the electrode 28 and the beta radiation pervious electrically conductive window 14 will define the beta radiation sensitive volume 44 of the ionization chamber 22. Because the housing 12 and the electrode 28 are both impervious to the beta radiation particles 18 the beta radiation sensitive volume 44 will be located between the electrically conductive window 14 and the concave surface of the electrode 28. Accordingly, volume 44 will encompass substantially all of the ionizable gaseous molecules entrapped within the ionization chamber 22 which are accessible to the beta radiation particles 18 because the remainder of the volume of the ionizatio nchamber 22 will be occupied by the electrode 28 or the electrode support structure 29 or will be shielded from the beta radiation particles 18 by the electrode 28. The detector 10 also includes an arrangement for creating an electrical potential within the ionization chamber 22 between the electrically conductive walls 24, the electrically conductive window 14 and the electrode 28. Typically, the arrangement for creating the electrical potential between the walls 24 and the electrode 28 and the window 14 and the electrode 28 will be a portable source of electricity such as a battery 32 which is electrically connected to the electrode 28, the electrically conductive walls 24 and the electrically conductive window 14 by a conventional electrical circuit 30. Separate connection of the circuit 30 to the electrically conductive window 14 and electrically conductive walls 24 is not necessary if the window 14 and the walls 24 are joined together so as to create an electrical path therebetween. However, the separate connection is preferred to guard against the possibility of the electrical path between the window 14 and the walls 24 being destroyed due to heavy in-field use and/or abuse of the detector 10. Also included within the electrical circuit 30 is a conventional on-off switch 34 for selectively activating the electrical potential and a conventional meter 36, for example an ampmeter, for detecting and measuring the amount of electricity flowing through the circuit 30 and for displaying the amount, in rads per hour, of radiation present. Alternativley, the meter 36 could perform the functions of detecting, measuring and displaying the amount of electric current present and the amount of beta radiation particles present could be conventionally separately calculated therefrom. The meter 36 is preferably separately powered by a second battery 38 which is connected to the meter 36 by a conventional electrical circuit 40 which includes its own conventional on-off switch 42. The circuitry of this detector 10 is conventionally grounded as at 60.

When the on-off switch 34 is in the "on" mode and an electrical potential exists between (1) the electrode 28, and (2) the electrically conductive walls 24 and the electrically conductive window 14 any ions formed within the beta radiation senstive volume 44 will flow, depending upon their charge, to either (1) the electrode 28 or (2) the electrically conductive walls 24 or the electrically conductive window 14. Accordingly, a measurable electrical current will flow through the electrical circuit 30. If the beta radiation impervious cover (not shown) has been placed over the electrically conductive window 14 so as to completely cover the opening 20, the entire radiation sensitive volume 22 will be inaccessible to beta radiation particles but will be accessible to gamma radiation particles. Therefore, if the on-off switch 42 is in the "on" mode, the meter 26 will detect and measure the amount of electricity flowing in circuit 30 and display the amount of gamma radiation present, preferably in rads per hour. When the beta radiation impervious cover is removed from a covering relationship with opening 20 both gamma and beta radiation particles will enter the chamber 22 and the meter 36 will detect and measure the new amount of electricity flowing in the circuit 30 and, after conventionally applying a volume correction factor due to the size differential between the gamma radiation sensitive volume 22 and the beta radiation sensitive volume 44 and subtracting the portion of the current due to gamma radiation particles, will display the amount of beta radiation particles present.

Importantly, the degree of screening beta radiation particles 18 from any portion of the beta radiation sensitive volume 44 as a result of the source 16 of beta radiation particles 18 being non-ideally located will be greatly reduced if not totally eliminated in most situations as a result of the fact that the surface of the electrode 28 facing the electrically conductive window 14 is formed with a generally shallow concave configuration. The shallow concave configuration of the surface of the electrode 28 results in the beta radiation sensitive volume 44 being much more accurately defined and known in both ideal and non-ideal beta source locations because those portions of the beta radiation sensitive volume 44 which are more probably screened from the radiation source 16 by the housing 12 are eliminated by an electrode having such a concave surface configuration. Accordingly, the calibration and individual field measurements of a detector 10 having an electrode 28 which includes a shallow concave surface facing the electrically conductive window 14 will be significantly improved over the measurements obtained in accordance with the prior devices illustrated in FIGS. 1-3 and discussed above.

While the substantially annular rim 70 of the electrode 28 should be substantially adjacent to the edge 26 of the electrically conductive walls 24 and should also substantially conform to the electrically conductive walls 24 it should be recognized that numerous geometrical configurations of the rim 70 and edge 26 are possible. Exemplary configurations include a substantially circular edge 26 and a corresponding substantially circular rim 70; a substantially square edge 26 and a corresponding substantially square rim 70; a substantially rectangular edge 26 and a corresponding substantially rectangular rim 70; a substantially elliptical edge 26 and a corresponding substantially elliptical rim 70; a substantially serpentine edge 26 and a corresponding substantially serpentine rim 70 and a substantially polygonal edge 26 and a corresponding substantially polygonal rim 70. The physical configuration of the opening 20 in each individual situation will be defined by the geometrical configuration of the edge 26. Because the electrode 28 is illustrated in cross-section in FIG. 4, and in FIGS. 5 and 6 also, it should be noted that in each instance the individual three dimensional shapes of these three electrode configurations would be obtained by rotating each respective cross-section through 360 degrees about the central vertical mirror image axis of each cross-section. Such action will result in an electrode 28 having a generally concave or bowl-shaped surface facing the window 14.

FIG. 5 illustrates another embodiment of the present invention wherein not only the generally annular rim 70 of the electrode 28 but also the electrode 28, itself, other than the surface facing the electrically conductive window 14, is configured to be substantially adjacent to and in substantial conformity with the electrically conductive walls 24. In this embodiment it may also be desired to decrease the depth of the ionization chamber 22, as illustrated in FIG. 5, to assist in closely conformingly configured the electrode 28 to the electrically conductive walls 24. This detector 10 also includes a beta radiation pervious plate or other cover arrangement (not shown) which is adapted to completely cover the opening 20. The electrode configuration eliminates the necessity of the detector 10 having to apply the volume correction factor discussed above with it is used in detecting, in addition to radiation particles which are incapable of passing through the housing 12, e.g. beta particles, radiation particles which are capable of passing through the housing 12, e.g. gamma particles. The superiority of the configuration illustrated in FIG. 5 over the above-discussed detector electrode configurations is readily apparent since, as a result of the substantial conforming of the electrode 28 to the electrically conductive walls 24, the radiation sensitive volume 44 of the ionization chamber 22 is essentially equivalent for all types of radiation particles because the electrode 28 and any electrode support structure present have been geometrically configured to substantially fill in and occupy substantially all portions of the ionization chamber 22 except for the radiation sensitive volume 44. Accordingly, only an extremely small volume of the ionization chamber 22 (the small space between the electrically conductive walls 24 and the electrode 28) will be accessible to housing penetrating particles, for example, gamma radiation particles, but inaccessible to housing non-penetrating particles, for example, beta radiation particles. Because the radiation sensitive volume 44 will be essentially the same for all types of radiation particles no volume correction factor will have to be applied in individually determining and displaying the separate amount of each type of particle present in a given situation.

FIG. 6 illustrates a further embodiment of the present invention which accomplishes all of the desired results of the embodiment illustrated in FIG. 5 through utilization of a slightly modified and different arrangement of components. Initially, it should be noted that the embodiment illustrated in FIG. 6 also includes a beta radiation impervious plate or other cover arrangement (not shown) which is adapted to completely cover the opening 20 and an electrode 28 which has a generally shallow concave surface which faces the window 14 and which has a cross-section that is formed solely by straight lines. In particular, the cross-section of the concave surface of the embodiment illustrated in FIG. 6 is formed from five (5), straight lines 100, 102, 104, 106 and 108 with lines 102 and 104 forming a thirty (30) degree angle with line 100 and with lines 106 and 108 forming a 30 degree angle with lines 102 and 104, respectively. Alternatively, lines 106 and 108 could be deleted and lines 102 and 104 could be modified to form a forty-five (45) degree angle with line 100. The cross-section of the generally shallow concave surface of the electrode 28 of FIG. 6 is to be contrasted with the cross-section of the generally shallow concave surface of the electrode 28 illustrated in FIG. 4 which is defined by a single curved line which defines a substantially elliptical cross-section. Any other combination of curved and/or straight lines may be utilized in any embodiment of the present invention. In any event, the scope of the present invention should not be interpreted as being limited to any specific generally shallow concave surface cross-section configurations since any shallow concave surface configuration may be used without departing from the scope and spirit of the present invention. However, it is preferred in all embodiments of the invention for the width of the generally shallow concave surface to be at least 1.5 times the depth of the generally shallow concave surface and more preferably at least 2.0 times the depth of the concave surface.

The embodiment of FIG. 6 differs from the embodiment of FIG. 4 in that the electrode 28 having a generally shallow concave surface facing the electrically conductive radiation pervious window 14 terminates at its generally annular rim 70 and a second electrode 74 is also located within the ionization chamber 22, both electrodes 28,74 are preferably supported by an electrically non-conducting, e.g. electrically insulating, electrode support support structure 29. The two electrodes are physically separated and thus electrically insulated from each other, for example, by the electrode support structure 29 as at 76. The second electrode 74 is electrically connected by a conventional electrical circuit 78 to a source of electricity such as a battery 32 with the circuit 78 also connecting the battery 32 to the electrically conductive walls 24 and the electrically conductive window 14. The circuit 78 may also include a conventional on-off switch 34. The circuit 78 is electrically grounded in conventional manner as at 60. Additionally, the electrode support structure 29 is mounted upon an electrode support structure mounting projection 86 which is adapted to conventionally receive and retain the electrode support structure 29. This arrangement of the electrode support structure 29 on the mounting projection 86 assures that the second electrode 74 will not contact the electrically conductive walls 24 and thereby short out the device.

Electrical circuit 30 electrically connects the shallow concave surfaced electrode 28 to a meter for detecting and measuring any current flowing in the circuit 30 and for displaying the amount of radiation present, preferably in rads per hour, is also included within the circuit 30. The meter 36 is connected to its own separate source of power such as a battery 38 by way of a conventional electric circuit 40 which may include a conventional on-off switch 42. This circuitry is also grounded as at 60.

When switch 34 is in the "on" mode, a first electrical potential will be created between the shallow concave surfaced electrode 28 and the electrically conductive walls 24 and the electrically conductive window 14 and a second electrical potential will be created between the second electrode 74 and the electrically conductive walls 24 and the electrically conductive window 14. One feature of this embodiment of the present invention is that the second electrode 74 is physically configured so that substantially all ions formed within the ionization chamber 22 outside of the radiation sensitive volume 44, for example within volume 46, will be caused to flow to the second electrode 74, through circuit 78 and to the conventional electrical ground 60. This second electrode 74 arrangement effectively prevents any ions created within the ionization chamber 22 outside of the radiation sensitive volume 44 from entering the radiation sensitive volume 44. That is, such ions are effectively electrically "bled-off" by the second electrode 74 to ground 60. Those ions which have been formed within the radiation sensitive volume 44 will flow, as a result of the electrical potential between the electrode 28 and the electrically conductive walls 24, to the electrode 28 and through the circuit 30. If the beta radiation impervious cover (not shown) has been placed over the electrically conductive window 14 so as to completely cover the opening 20, the radiation sensitive volume will be inaccessible to beta radiation particles but will be accessible to gamma radiation particles. Therefore, if the "on-off" switch 42 is in the "on" mode, the meter 36 which is included in circuit 30 will detect and measure the amount of any current flowing through the circuit 30 and display the amount of gamma radiation dose rate present preferably in rads per hour. When the beta radiation impervious cover is removed from a covering relationship with opening 20 both gamma and beta radiation particles can enter the chamber 22 and the meter 36 will detect and measure the new amount of electricity flowing in the circuit 30 and, after subtracting the portion of the current due to gamma radiation dose rate, will display the amount of beta radiation dose rate present. Since the meter 36 is not included in the circuit 78 only those ions formed within the radiation sensitive volume 44 will flow through the circuit 30 and be detected and measured by the meter 36. Thus, the radiation sensitive volume 44 of the detector 10 of FIG. 6 will be the same for both gamma and beta radiation particles and a volume correction factor will not have to be utilized in calculating and displaying the separate amounts of gamma and beta radiation present at any given site.

The elements of the present invention might be combined in many alternate configurations other than those disclosed in the present description and drawings, and the particular embodiments disclosed in full detail herein and illustrated in the drawings have been provided for disclosure purposes only and are not intended to limit the scope of the present invention, which is to be determined by the scope of the appended claims.

What is claimed is:

1. A portable device for in-field usage for measuring the dose rate of an ambient beta radiation field, comprising:

a housing, substantially impervious to beta radiation, defining an ionization chamber and having an opening into the ionization chamber;

beta radiation pervious electrically-conductive window means covering said opening and entrapping, within said ionization chamber, a quantity of gaseous molecules adapted to ionize upon impact with beta radiation particles;

electrode means disposed within the ionization chamber and having a generally shallow concave surface terminating in a generally annular rim disposed at a substantially close spacing to said window means and configured to substantially conform to said window means to define a known beta radiation sensitive volume generally between the window means and the concave surface of the electrode means, said concave surface being effective to substantially fully expose said beta radiation sensitive volume to said radiation field over substantially the full ambient area faced by said window means;

electrical potential means, including a circuit electrically connecting said electrically conductive window means to said electrode means, for establishing an electrical potential between said electrode means and said window means and adapted, upon creation of ions within the beta radiation sensitive volume of the ionization chamber by impact of beta radiation particles from said field with said ionizable molecules within said beta radiation sensitive volume, to cause a measurable electric current of a value substantially directly related to the dose rate of said radiation field to flow within said circuit between the window means and the electrode means; and means for detecting and measuring electric current flowing within said circuit between said window means and said electrode means to permit calculation of the directly-related dose rate of said radiation field.

2. The device according to claim 1, wherein said electrical potential means includes a battery electrically connected by said circuit to both the electrode means and the window means.

3. The device according to claim 1, wherein said detecting and measuring means includes a meter adapted to display the amount of beta radiation dose rate present.

4. The device according to claim 1, wherein the generally annular rim of the electrode is substantially circular, the opening of the housing is substantially circular and the cross-section of the substantially concave surface of the electrode is defined solely by straight lines.

5. The device according to claim 1, wherein the generally annular rim of the electrode is substantially circular, the opening of the housing is substantially circular and the cross-section of the substantially concave surface of the electrode is defined solely by at least one curved line.

6. The device according to claim 1, wherein said electrode means is supported on an electrically nonconducting electrode support structure disposed within said ionization chamber and which insulates the electrode means from the housing.

7. The device according to claim 6, wherein said electrode support structure is formed from a material selected from the group consisting of a polymer selected from the group of polymethyl methacrylate polymers, a material comprising glass fibers or polytetrafluoroethylene.

8. The device according to claim 6, wherein the electrode means consists essentially of an electrically conductive material which has been coated onto the electrode support structure.

9. The device according to claim 8, wherein said electrically conductive material is selected from the group consisting of graphite coating material or metallic coating material.

10. The device according to claim 1, wherein the width of the generally shallow concave surface of the electrode is at least 1.5 times the depth of the generally shallow concave surface of the electrode.

11. A portable device for in-field usage for measuring the dose rate of an ambient beta and gamma radiation field, comprising:
a housing, substantially impervious to beta radiation and substantially pervious to gamma radiation, defining an ionization chamber and terminating in an edge defining an opening into the ionization chamber;
beta and gamma radiation pervious electrically-conductive window means completely covering said opening and entrapping, within said ionization chamber, a quantity of gaseous molecules adapted to ionize upon impact with beta and gamma radiation particles;
electrode means disposed within the ionization chamber and having a generally shallow concave surface terminating in a generally annular rim disposed at a substantially close spacing to said window means and to said edge of the housing and configured to substantially conform to said edge of the housing to define a known beta and gamma radiation sensitive volume generally between the window means and the concave surface of the electrode means, said concave surface being effective to substantially fully expose said radiation sensitive volume to said radiation field over substantially the full ambient area faced by said window means;
electrical potential means, including a circuit electrically connecting said electrically conductive window means to said electrode means, for establishing an electrical potential between said electrode means and said window means and adapted upon creation of ions within the beta and gamma radiation sensitive volume of the ionization chamber by impact of beta or gamma radiation particles from said field with said ionizable molecules within said beta and gamma radiation sensitive volume, to cause a measurable electric current of a value substantially directly related to the dose rate of said radiation field to flow within said circuit between the window means and the electrode means; and
means for detecting and measuring electric current flowing within said circuit between said window means and said electrode means to permit calculation of the directly-related dose rate of said radiation field.

12. The device according to claim 11, wherein said electrical potential means includes a battery electrically connected by said circuit to both the electrode means and the window means.

13. The device according to claim 11, wherein said detecting and measuring means includes a meter adapted to display the amount of beta and gamma radiation dose rate present.

14. The device according to claim 11, wherein the generally annular rim of the electrode is substantially circular, the edge of the housing defines said opening to be substantially circular and the cross-section of the substantially concave surface of the electrode is defined solely by straight lines.

15. The device according to claim 11, wherein the generally annular rim of the electrode is substantially circular, the edge of the housing defines said opening to be substantially circular and the cross-section of the substantially concave surface of the electrode is defined solely by at least one curved line.

16. The device according to claim 11, wherein said electrode means is supported on an electrically non-conducting electrode support structure disposed within said ionization chamber and which insulates the electrode means from the housing.

17. The device according to claim 16, wherein said electrode support structure is formed from a material selected from the group consisting of a polymer selected from the group of polymethyl methacrylate polymers, a material comprising glass fibers or polytetrafluoroethylene.

18. The device according to claim 16, wherein the electrode means consists essentially of an electrically conductive material which has been coated onto the electrode support structure.

19. The device according to claim 18, wherein said electrically conductive material is selected from the group consisting of graphite coating material or metallic coating material.

20. The device according to claim 11, wherein the width of the generally shallow concave surface of the electrode is at least 1.5 times the depth of the generally shallow concave surface of the electrode.

21. A portable device for in-field usage for measuring the dose rate of an ambient beta and gamma radiation field, comprising:
a housing, substantially impervious to beta radiation and substantially pervious to gamma radiation, defining an ionization chamber and terminating in an edge defining an opening into the ionization chamber;
beta and gamma radiation pervious electrically-conductive window means completely covering said opening and entrapping, within said ionization chamber, a known quantity of gaseous molecules adapted to ionize upon impact with beta and gamma radiation particles;
first electrode means disposed within the ionization chamber and having a generally shallow concave surface terminating in a generally annular rim disposed at a substantially close spacing to said window means and to said edge of the housing and configured to substantially conform to said edge of the housing to define a known beta and gamma radiation sensitive volume generally between the window means and the concave surface of the electrode means, said concave surface being effective to substantially fully expose said radiation sensitive volume to said radiation field over substantially the full ambient area faced by said window means;
electrical potential means, including a first electrical circuit electrically connecting said electrically conductive window means to said first electrode means, for establishing an electrical potential between said first electrode means and said window means, said electrical potential means being adapted, upon creation of ions within the beta or gamma radiation sensitive volume of the ionization chamber of impact of beta or gamma radiation particles with said ionizable molecules within said beta and gamma radiation sensitive volume, to cause a measurable electric current of a value substantially directly related to the dose rate of said radiation field to flow within said first electrical circuit between the first electrode means and said window means;

second electrode means disposed within said ionization chamber and being connected by a second electrical circuit to an electrical ground means for causing ions created within said ionization chamber outside said beta and gamma radiation sensitive volume to flow within said second electrical circuit to said ground means to prevent ions created within said ionization chamber outside of said beta and gamma radiation sensitive volume from entering said beta and gamma radiation sensitive volume and flowing within said first electrical circuit; and means included within said first electrical circuit for detecting and measuring electric current flowing within said first electrical circuit between said first electrode means and said window means to permit calculation of the directly-related dose rate of said radiation field.

22. The device according to claim 21, wherein said electrical potential means includes a battery electrically connected by said first circuit to both the first electrode means and the window means.

23. The device according to claim 21, wherein said detecting and measuring means includes a meter adapted to display the amount of beta and gamma radiation dose rate present.

24. The device according to claim 21, wherein the generally annular rim of the first electrode is substantially circular, the edge of the housing defines said opening to be substantially circular and the cross-section of the substantially concave surface of the first electrode is defined solely by straight lines.

25. The device according to claim 21, wherein the generally annular rim of the first electrode is substantially circular, the edge of the housing defines said opening to be substantially circular and the cross-section of the substantially concave surface of the first electrode is defined solely by at least one curved line.

26. The device according to claim 21, wherein said first and second electrode means are both supported on an electrically non-conducting electrode support structure disposed within said ionization chamber and which electrically insulates the two electrode means from each other.

27. The device according to claim 26, wherein said electrode support structure is formed from a material selected from the group consisting of a polymer selected from the group of polymethyl methacrylate polymers, a material comprising glass fibers or polytetrafluoroethylene.

28. The device according to claim 26, wherein the electrode means consists essentially of an electrically conductive material which has been coated onto the electrode support structure.

29. The device according to claim 28, wherein said electrically conductive material is selected from the group consisting of graphite coating material or metallic coating material.

30. The device according to claim 21, wherein the width of the generally shallow concave surface of the first electrode is at least 1.5 times the depth of the concave surface of the first electrode.

31. A portable device for in-field usage for measuring the dose rate of an ambient beta radiation field, comprising:

a housing, substantially impervious to beta radiation and having an opening into an interior area of said housing;

beta radiation pervious electrically-conductive window means covering said opening;

electrode means disposed within said interior area and having a generally shallow concave surface terminating in a generally annular rim disposed at a substantially close spacing to said window means and configured to substantially conform to said window means to define generally between the window means and the concave surface of the electrode means an ionization chamber having a known beta radiation sensitive volume of gaseous molecules adapted to ionize upon impact with beta radiation particles, said concave surface being effective to substantially fully expose said beta radiation sensitive volume to said radiation field over substantially the full ambient area faced by said window means;

electrical potential means, including a circuit electrically connecting said window means to said electrode means, for establishing an electrical potential between said electrode means and said window means and adapted, upon creation of ions within the beta radiation sensitive volume by impact of beta radiation particles from said field with said ionizable molecules within said beta radiation sensitive volume, to cause a measurable electric current of a value substantially directly related to the dose rate of said radiation field to flow within said circuit between the window means and the electrode means; and means for detecting and measuring electric current flowing within said circuit between said window means and said electrode means to permit calculation of the directly-related dose rate of said radiation field.

* * * * *

UNITED STATES PATENT OFFICE
CERTIFICATE OF CORRECTION

Patent No. 4,644,167      Dated February 17, 1987

Inventor(s) Robert Sorber

It is certified that error appears in the above-identified patent and that said Letters Patent are hereby corrected as shown below:

Col. 2, Line 66, delete "inaccesible" and insert therefor — inaccessible — .
Col. 5, Line 9, delete "combine" and insert therefor — combined — .
Col. 6, Line 11, delete "and" and insert therefor — or — .
Col. 7, Line 49, delete "beind" and insert therefor — behind — .
Col. 10, Line 45, delete "of" and isnert therefor — or — .
Col. 13, Line 23, delete "adjacnet" and insert therefor — adjacent — .
Col. 13, Line 38, delete "ionizatio nchamber" and insert therefor — ionization chamber — .
Col. 13, Lines 66-67, delete "Alternativley" (hyphenated) and insert therefor — Alternatively — .
Col. 14, Line 13, delete "senstive" and insert therefor — sensitive — .
Col. 14, Line 24, delete "26" and insert therefor — 36 — .
Col. 15, Line 31, delete "configured" and insert therefor — configuring — .
Col. 15, Line 35, delete "The", first occurrence thereof, and insert therefor — This — .
Col. 15, Line 37, delete "with" and insert therefor — when — .
Col. 16, Line 43, delete "support", second occurrence thereof.

Signed and Sealed this

Ninth Day of February, 1988

*Attest:*

DONALD J. QUIGG

*Attesting Officer*      *Commissioner of Patents and Trademarks*